(12) United States Patent
Luo et al.

(10) Patent No.: US 11,457,034 B2
(45) Date of Patent: Sep. 27, 2022

(54) DISTRIBUTION-BASED DETECTION OF ABUSIVE REQUESTS

(71) Applicant: Microsoft Technology Licensing, LLC, Redmond, WA (US)

(72) Inventors: Shoufu Luo, San Jose, CA (US); Yi-Wei Lin, San Jose, CA (US); Samridh Saluja, Dublin, CA (US); Rui Han, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 290 days.

(21) Appl. No.: 16/836,105

(22) Filed: Mar. 31, 2020

(65) Prior Publication Data
US 2021/0306358 A1    Sep. 30, 2021

(51) Int. Cl.
*H04L 29/08*   (2006.01)
*H04L 9/40*   (2022.01)
*G06K 9/62*   (2022.01)

(52) U.S. Cl.
CPC ........ *H04L 63/1425* (2013.01); *G06K 9/6215* (2013.01); *G06K 9/6218* (2013.01); *H04L 63/1416* (2013.01)

(58) Field of Classification Search
USPC .......................................................... 709/22
See application file for complete search history.

(56) References Cited

U.S. PATENT DOCUMENTS

| | | |
|---|---|---|
| 7,895,653 B2 | 2/2011 | Calo et al. |
| 9,075,990 B1 | 7/2015 | Yang |
| 9,420,049 B1 | 8/2016 | Talmor et al. |
| 9,430,646 B1 | 8/2016 | Mushtaq et al. |
| 9,628,498 B1 | 4/2017 | Aziz et al. |
| 9,930,053 B2 | 3/2018 | Beauchesne |
| 10,037,546 B1 | 7/2018 | Benisch et al. |
| 10,133,789 B2 * | 11/2018 | Li .................. H04L 67/22 |
| 10,270,792 B1 | 4/2019 | Shemesh |
| 10,621,322 B2 | 4/2020 | Benkreira et al. |

(Continued)

OTHER PUBLICATIONS

"Notice of Allowance Issued in U.S. Appl. No. 16/204,253", dated Jul. 13, 2020, 22 Pages.

*Primary Examiner* — Jude Jean Gilles (74) *Attorney, Agent, or Firm* — Nicholson De Vos Webster & Elliott LLP (57) ABSTRACT

The disclosed embodiments provide a system for detecting abusive requests. During operation, the system generates, based on one or more primary signals, a first set of clusters of network requests spanning a first period and a second set of clusters of requests spanning a second period. Next, the system stores, in a snapshot, a signature representing primary signal values and a first distribution of secondary signals in a first cluster in the first set of clusters. The system matches primary signal values from a second cluster in the second set of clusters to the signature and calculates a divergence score representing a deviation of a second distribution of secondary signals in the second cluster from the first distribution. When the divergence score violates a threshold, the system generates output for identifying additional network requests that contain one or more primary and secondary signal values in the second cluster.

20 Claims, 5 Drawing Sheets

(56) References Cited

U.S. PATENT DOCUMENTS

| | | |
|---|---|---|
| 2012/0254269 A1* | 10/2012 | Carmichael .............. G06F 16/13 |
| | | 709/224 |
| 2014/0278610 A1 | 9/2014 | Carnahan et al. |
| 2015/0264068 A1 | 9/2015 | Beauchesne |
| 2015/0347734 A1* | 12/2015 | Beigi ................... H04L 9/3268 |
| | | 726/28 |
| 2017/0034190 A1 | 2/2017 | May |
| 2017/0126709 A1 | 5/2017 | Baradaran et al. |
| 2017/0126718 A1 | 5/2017 | Baradaran et al. |
| 2018/0103047 A1 | 4/2018 | Turgeman et al. |
| 2018/0332126 A1 | 11/2018 | Metwalley et al. |
| 2018/0343280 A1 | 11/2018 | McQueen et al. |
| 2019/0089655 A1 | 3/2019 | Uppala et al. |
| 2020/0055186 A1 | 2/2020 | Nocon et al. |

\* cited by examiner

DISTRIBUTION-BASED DETECTION OF ABUSIVE REQUESTS

RELATED APPLICATION

The subject matter of this application is related to the subject matter in a co-pending non-provisional application entitled "Signal Distribution Score for Bot Detection," having Ser. No. 16/204,253, and filing date 29 Nov. 2018.

BACKGROUND

Field

The disclosed embodiments relate to anti-abuse infrastructures. More specifically, the disclosed embodiments relate to techniques for performing distribution-based detection of abusive requests.

Related Art

Incident response techniques are commonly used to address and manage attacks such as security breaches, fake user accounts, spamming, phishing, account takeovers, scraping, and/or other types of malicious or undesired user activity. For example, an organization includes an incident response team and/or incident response system that identifies, responds to, escalates, contains, and/or recovers from security incidents. The organization also analyzes past incidents to obtain insights related to responding to and/or preventing similar types of activity in the future. Consequently, the negative impact of security incidents may be reduced by quickly and effectively detecting, adapting to, and responding to malicious activity within Information Technology (IT) infrastructures.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments relate to a method, apparatus, and system for detecting abusive requests received by an online system. In some embodiments, abusive requests include requests that are used to carry out attacks such as security breaches, fake user accounts, account takeovers, spamming, phishing, scraping, and/or other types of fraudulent, malicious or undesired activity on the online system. Because abusive requests are frequently generated by bots or other automated techniques, the abusive requests tend to adhere to certain patterns of values in attributes such as HyperText Transfer Protocol (HTTP) header fields.

More specifically, the disclosed embodiments provide a method, apparatus, and system for performing distribution-based detection of abusive requests. In these embodiments, distributions of attributes of requests to the online system are tracked over time to identify deviations in the distributions that are indicative of abusive requests. These attributes include, but are not limited to, individual HTTP header fields and/or collections of attributes fields in the requests.

First, network requests received by the online system over a given time period (e.g., a number of minutes, hours, days, etc.) are clustered by a primary signal that includes one or more attributes of the requests. For example, the network requests include HTTP, Simple Mail Transfer Protocol (SMTP), File Transfer Protocol (FTP), and/or other types of requests that utilize network protocols to send and receive data. Because an online system with millions to billions of users can receive thousands to millions of requests per second, anomalies in the requests cannot be manually monitored or reviewed in a scalable way by an incident response team of humans. Instead, clusters of HTTP requests are generated based on edit distances between strings (e.g., User-Agent strings) in the primary signals and/or Jaccard indexes between collections of tokens and/or HTTP header fields in the primary signals.

Next, distributions of a secondary signal in the clustered requests are generated and stored with representations of the primary signal in the clusters. The secondary signal includes one or more attributes of the requests that are not found in the primary signal. For example, the primary signal includes a User-Agent string and the secondary signal includes an HTTP Referer. As a result, clusters of the requests are generated so that each cluster includes requests with HTTP headers that have similar and/or identical User-Agent strings. Within a given cluster, a distribution of requests by HTTP Referer is generated to include mappings of Referer values in the cluster to counts of requests in the cluster that contain the Referer values. A "signature" that is a regular expression or another string-based representation of the User-Agent strings in the cluster is then stored with the mappings of Referer values to the corresponding counts, as well as a total number of requests in the cluster. These stored values serve as a "snapshot" of the distribution of attributes in the cluster over a corresponding time period.

Snapshots of attribute distributions in clusters of requests are also compared across time periods to detect deviations in the distributions that are indicative of abusive requests. For example, a divergence score is calculated between snapshots of clusters of requests with the same primary signal attribute "signature" (e.g., clusters of requests with the same primary signal values, highly similar primary signal values, and/or primary signal values that are represented by the same regular expression) from selected time periods. The divergence score measures the differences in distributions of secondary signals between the two clusters. The divergence score is also compared to a threshold; if the divergence score does not meet the threshold (e.g., if the divergence score exceeds the threshold), a subset of requests in the cluster from the later time period is detected to be abusive or anomalous.

In turn, attributes of abusive requests are used to block or take other action on subsequent requests with the same attributes. For example, one or more secondary signal values that contribute to a difference in distribution of secondary signals between two clusters of requests with the same primary signal values are identified. A regular expression and/or another string pattern that can be matched to the identified secondary signal values and/or primary signal values of the clusters is generated and added to a list of signatures of abusive requests. As subsequent requests are received by the online system, primary and secondary signals of the subsequent requests are compared with entries in the list. When a request contains a combination of primary and secondary signals that matches a regular expression in the list, the request is blocked, flagged, delayed, rerouted, or otherwise handled in a way that prevents or mitigates attacks on the online system.

By identifying changes in distributions of secondary signals in requests that are clustered by primary signals, the disclosed embodiments detect patterns in attributes of abusive requests that are generated by bots or other automated techniques, even when the patterns involve multiple attribute types and/or values and/or the abusive requests are found in large volumes of requests that cannot be monitored or reviewed manually. Subsequent requests with the same attributes can then be blocked or otherwise handled to reduce electronic theft, disruptions to the operation of the online system, and/or other damage caused by attacks that utilize the abusive requests. At the same time, requests that do not match these patterns of attributes are allowed through, thereby allowing the online system to continue processing legitimate requests during these types of attacks.

In contrast, conventional techniques attempt to detect attacks from sudden traffic increases and/or changes in numbers of requests associated with individual attribute values. As a result, these techniques may be unable to detect attacks that generate abusive requests with varying values in two or more attributes. This allows the attacks to be carried out undetected, which potentially compromises data and/or software targeted by the attacks and/or disrupts operation of computers, services, and/or distributed systems on which the data and/or software reside. Because the disclosed embodiments improve the detection of and response to computer security incidents that involve abusive requests generated by automated techniques, the disclosed embodiments provide a solution to the technical problem of securing and maintaining computer systems, online systems, and/or distributed systems.

Distribution-Based Detection of Abusive Requests

Figure 1:
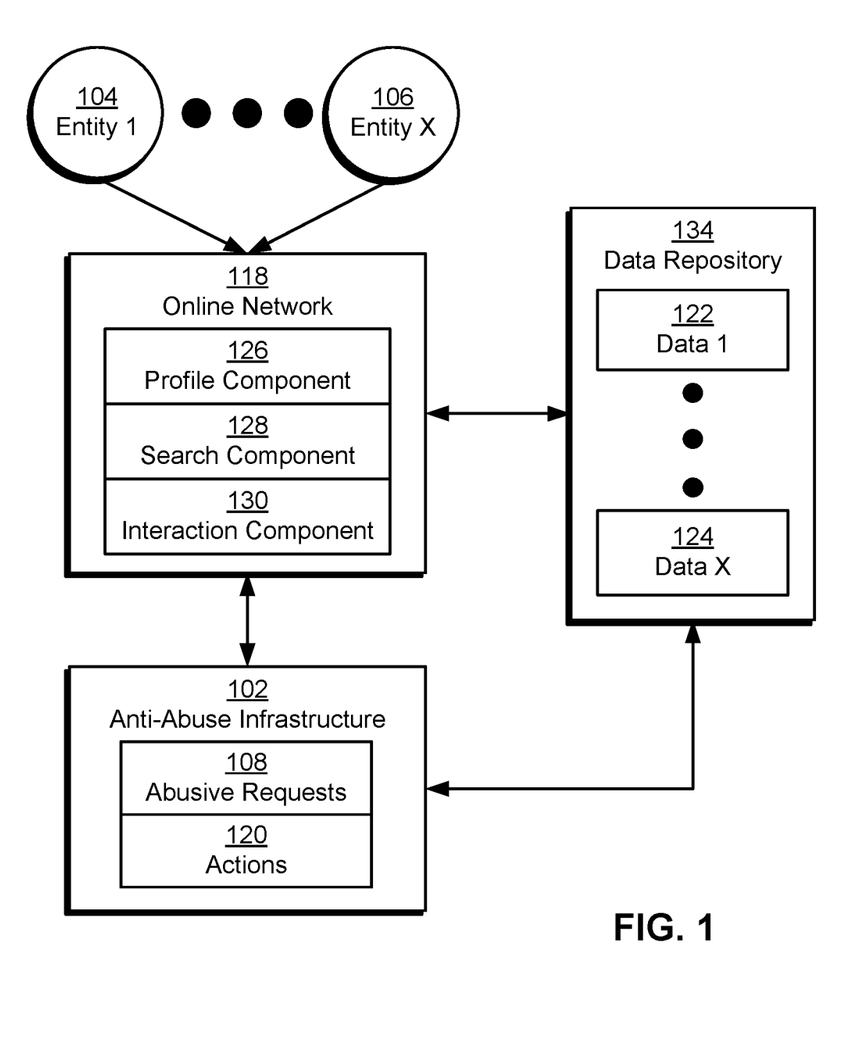
FIG. 1 shows a schematic of a system in accordance with the disclosed embodiments.

FIG. 1 shows a schematic of a system in accordance with the disclosed embodiments. As shown in FIG. 1, the system includes an online network 118 and/or other user community. For example, online network 118 includes an online professional network that is used by a set of entities (e.g., entity 1 104, entity x 106) to interact with one another in a professional and/or business context.

The entities include users that use online network 118 to establish and maintain professional connections, list work and community experience, endorse and/or recommend one another, search and apply for jobs, and/or perform other actions. The entities also, or instead, include companies, employers, and/or recruiters that use online network 118 to list jobs, search for potential candidates, provide business-related updates to users, advertise, and/or take other action.

Online network 118 includes a profile component 126 that allows the entities that are registered users of online network 118 to create and edit profiles containing information related to the entities' professional and/or industry backgrounds, experiences, summaries, job titles, projects, skills, and so on. Profile component 126 also allows the entities to view the profiles of other entities in online network 118.

Profile component 126 also, or instead, includes mechanisms for assisting the entities with profile completion. For example, profile component 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search component 128 that allows entities that include registered users and guest users (e.g., users that are not logged into accounts with online network 118) to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction component 130 that allows entities that are registered users to interact with one another on online network 118. For example, interaction component 130 may allow a user, company, school, or other entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or features. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 is logged and stored in a database, data warehouse, cloud storage, and/or other data-storage mechanism providing data repository 134.

In turn, the data is analyzed by an anti-abuse infrastructure 102 in a real-time, nearline, and/or offline basis to detect and respond to attacks such as security breaches, fake user accounts, account takeovers, spamming, phishing, scraping, and/or other types of malicious or undesired user activity with online network 118. As described in further detail below with respect to FIG. 2, anti-abuse infrastructure 102 detects abusive requests 108 that are used to conduct the attacks based on values of HTTP header fields and/or other attributes that cause deviations from distributions of the attributes in "normal," non-attack traffic. When abusive requests 108 are detected, anti-abuse infrastructure 102 generates and/or executes actions 120 for responding to or mitigating the attacks. These actions include, but are not limited to, accepting, delaying, redirecting, and/or blocking abusive requests 108; flagging abusive requests 108 and/or entities making abusive requests 108 for manual review; whitelisting or blacklisting attributes of abusive requests 108 and/or the entities; and/or presenting challenges related to abusive requests 108.

Figure 2:
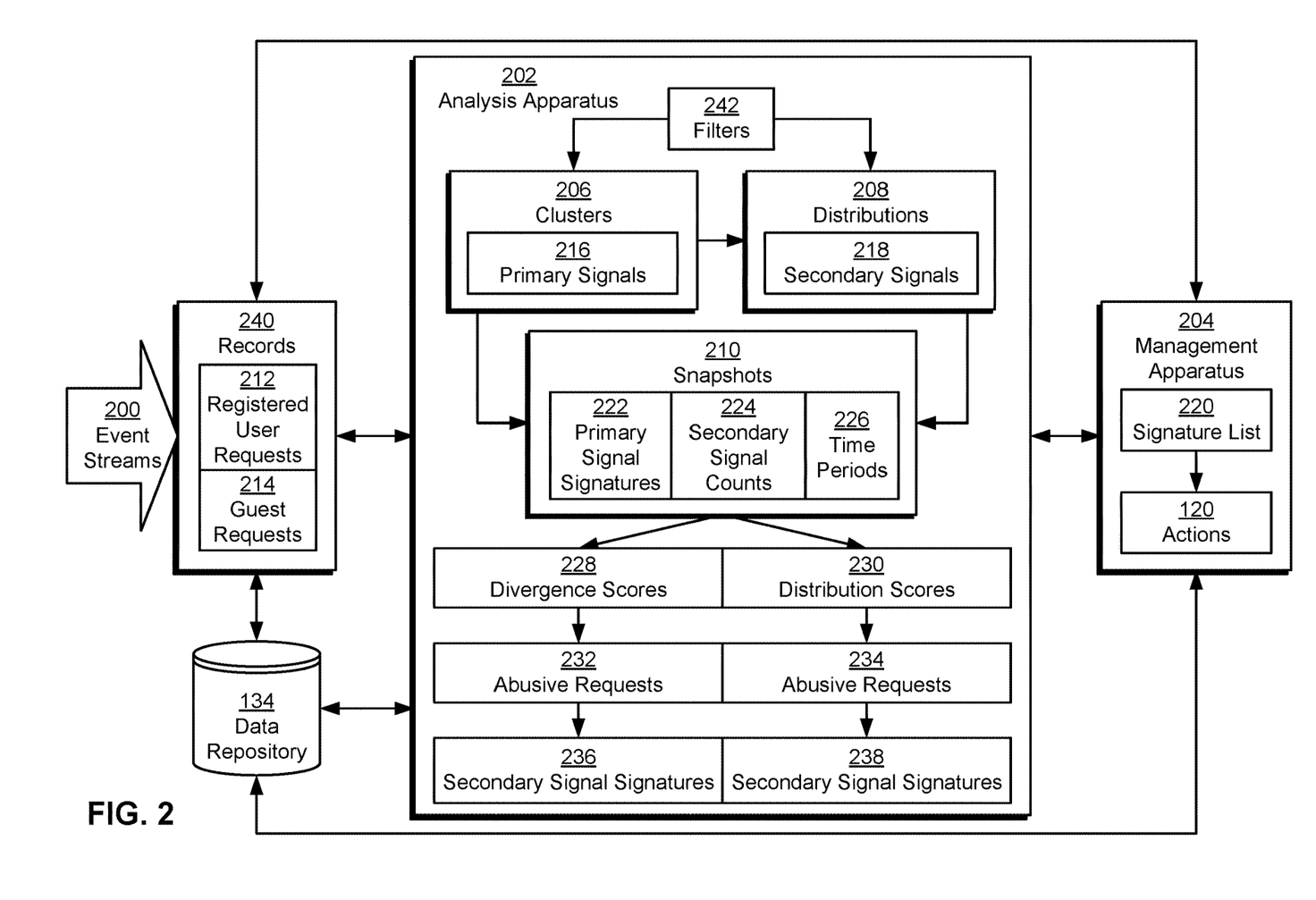
FIG. 2 shows a system for detecting abusive requests in accordance with the disclosed embodiments.

FIG. 2 shows a system for detecting abusive requests (e.g., anti-abuse infrastructure 102 of FIG. 1) in accordance with the disclosed embodiments. The system includes an analysis apparatus 204 and a management apparatus 206, which interact with one another and use data repository 134 to manage attacks and/or other security incidents that target an online system. For example, the system of FIG. 2 may be used to detect and manage potentially malicious activity in an online network (e.g., online network 118 of FIG. 1), online storage system, e-commerce platform, website, web application, email service, messaging service, online banking service, cloud computing system, and/or another type of online or distributed system.

Analysis apparatus 202 analyzes attributes of network requests transmitted to or received by the online system. In some embodiments, the requests include registered user requests 212 from registered users that have users accounts and/or profiles with the online system. These registered user requests 212 include user identifiers (IDs), access tokens, and/or other encrypted data representing the corresponding registered users at the application layer of the network stack. Requests to the online system also include guest requests 214 from users that are not registered with the online system and/or users that are not logged in to accounts with the online system. As a result, guests requests 214 lack attributes associated with registered users of the online system at the application layer of the network stack.

In one or more embodiments, records 240 containing some or all portions of registered user requests 212 and guest requests 214 are received over one or more event streams 200 and aggregated into data repository 134. For example, event streams 200 are generated and/or maintained using a distributed streaming platform. Each event in event stream 200 contains a record of a request to the online system. The record is generated after the request is received by a component of the online system. The record is then propagated to components subscribing to event streams 200 on a nearline basis. As a result, analysis apparatus 202 may receive records 240 of registered user requests 212 and guest requests 214 in near-real-time as the records are transmitted over event streams 200. Analysis apparatus 202 may also, or instead, obtain records 240 from data repository 134 after records 240 are aggregated into data repository 134 from event streams 200 and/or another data source.

In one or more embodiments, analysis apparatus 202 detects abusive requests 232-234 in registered user requests 212, guest requests 214, and/or other requests received by the online system based on distributions 208 of attributes in the requests. For example, analysis apparatus 202 monitors guest requests 214 for patterns of attributes that are indicative of attacks related to scraping, account takeovers, fake account creation, and/or other types of activity performed by non-registered users of the online system. As a result, analysis apparatus 202 may monitor only records 240 of guest requests 214 for abusive requests 232-234 that are used to carry out these types of attacks. Conversely, analysis apparatus 202 may monitor records 240 of registered user requests 212 and/or records 240 of both registered user requests 212 and guest requests 214 for abusive requests 232-234 related to other types of attacks.

More specifically, analysis apparatus 202 generates, stores, analyzes, and/or compares snapshots 210 of attributes in the monitored requests over a number of time periods 226 to detect the presence of abusive requests 232-234 in the monitored requests. As shown in FIG. 2, snapshots 210 are generated from clusters 206 of requests by one or more primary signals 216, as well as distributions 208 of one or more secondary signals 218 in clusters 206.

In one or more embodiments, primary signals 216 and secondary signals 218 include fields in headers of the monitored requests. Each primary signal includes one or more attributes by which the monitored requests are to be clustered, and each secondary signal includes one or more attributes that are not found in a corresponding primary signal. For example, each primary and/or secondary signal includes one or more include names, string values, and/or token values of individual fields and/or combinations of fields from HTTP headers in the requests. These fields and/or combinations of fields include, but are not limited to, User-Agent, Host, Referer, Accept-Encoding, and/or Accept-Language.

To generate a set of snapshots 210 for a given time period (e.g., time periods 226), analysis apparatus 202 uses primary signals 216 to generate clusters 206 of requests received over the time period. For example, analysis apparatus 202 calculates edit distances between strings in primary signals 216, Jaccard indexes between sets of tokens or strings in primary signals 216, and/or other measures of similarity or distance between values or sets of values of primary signals 216 in pairs of requests. Analysis apparatus 202 then uses a clustering technique such as density-based spatial clustering of applications with noise (DBSCAN), ordering points to identify the cluster structure (OPTICS), spectral clustering, and/or another type of clustering technique to generate clusters 206 of requests. As a result, each of clusters 206 includes requests received over the time period that have identical, overlapping, or highly similar values of primary signals 216, as determined based on the metrics (e.g., edit distances, Jaccard indexes, etc.) by which the requests are clustered and/or the technique used to generate clusters 206.

After clusters 206 are generated, analysis apparatus 202 determines distributions 208 of secondary signals 218 within individual clusters 206 of requests. For example, analysis apparatus 202 obtains clusters 206 of requests with primary signals 216 that include identical or similar Referer fields. For each cluster, analysis apparatus 202 determines a distribution of Accept-Encoding values in requests within the cluster by counting the number of times each Accept-Encoding value is found in the requests and optionally dividing the count by the total number of requests in the cluster. Distributions 208 of secondary signals 218 within clusters 206 of requests by primary signals are described in further detail below with respect to FIGS. 3A-3B.

Analysis apparatus 202 then generates snapshots 210 that describe primary signals 216 and distributions 208 of secondary signals 208 in clusters 206. In particular, analysis apparatus 202 generates primary signal signatures 222 from values of primary signals 216 in individual clusters 206. Each primary signal signature includes one or more regular expressions and/or other string-based patterns that match all values of primary signals 216 in a corresponding cluster. For example, analysis apparatus 202 creates a primary signal signature that includes a regular expression of ".*.linkedin.com" for a cluster of requests with Referer values that include "linkedin.com."

Analysis apparatus 202 then stores, in a snapshot for a cluster of requests from a given time period, a primary signal signature for the cluster and a list of secondary signal counts 224 of values of secondary signals 218 found in requests within the cluster. For example, analysis apparatus 202 uses the following schema to create each snapshot:

primary_signal: <signatures>, secondary_signal: map<hash(values), count>, total requests The above schema includes a "primary_signal" field representing one or more names of one or more primary signals 222, followed by one or more "signatures" (e.g., primary signal signatures 222) that represent values of the primary signal(s) in the cluster. Next, the schema includes a "secondary_signal" field representing one or more names of one or more secondary signals 218, which is followed by a list of secondary signal counts 224 for the values of secondary signals 218 in the cluster. Each element in the list includes a mapping of a hash of one or more "values" of the secondary signal(s) to a "count" of requests in the cluster that contain the secondary signal value(s). The hash is optionally generated and included in the snapshot in lieu of string-based values of the secondary signal(s) to save space. Finally, the schema includes a "total requests" field that stores the total number of requests in the cluster.

Consequently, each snapshot includes information that characterizes values of primary signals 216 in the cluster, as well as numbers and/or proportions of values of secondary signals 218 in requests within the cluster. Using the above example schema, a snapshot of requests in a cluster includes the following representation:

(Referer:.*.linkedin.com/), UA: (d718127f427a494b79e94a3b4a46f7e23: 323, . . . ), 5479)

The above representation includes a primary signal named "Referer," which is mapped to a primary signal signature of ".*.linkedin.com/" (i.e., a regular expression that matches all strings that end in "linkedin.com/"). Next, the representation includes a secondary signal named "UA" (e.g., User-Agent), which is mapped to a list of mappings between hashes of values of the secondary signal and counts of the values in the cluster. The first mapping in the list includes a hash of "d718127f427a494b79e94a3b4a46f7e23" and a count of "323." Finally, the representation includes a value of "5479" for the total number of requests in the cluster.

After a set of snapshots 210 is generated from clusters 206 of requests collected over a given time period, analysis apparatus 202 stores snapshots 210 with a representation of the time period in a cache, data repository 134, and/or another data store. For example, analysis apparatus 202 stores each set of snapshots 210 with one or more timestamps representing the time period spanned by requests represented by the set of snapshots 210.

Analysis apparatus 202 then analyzes individual snapshots 210 and/or compares snapshots 210 across different time periods 226 to detect abusive requests 232-234 in the monitored requests. First, analysis apparatus 202 calculates divergence scores 228 between pairs of snapshots 210 with the same primary signal signatures 222 from adjacent and/or different time periods 226. For example, analysis apparatus 202 periodically calculates divergence scores 228 between a first set of snapshots 210 of clusters 206 of requests received over a most recent time period (e.g., the last hour) and a second set of snapshots 210 of clusters 206 of requests received over a time period preceding the most recent time period (e.g., a one-hour period occurring immediately before the last hour). Divergence scores 228 include a separate divergence score between each pair of snapshots (one from each time period) that have identical or substantially identical primary signal signatures 222.

In another example, analysis apparatus 202 calculates divergence scores 228 between a first set of snapshots 210 of clusters 206 of requests received over the most recent time period and an aggregate representation of additional sets of snapshots 210 (e.g., average secondary signal counts 224 associated with the same primary signal signature) over a number of time periods 226 (e.g., a number of hours or days) before the most recent time period. In this example, analysis apparatus 202 is able to compare the distributions of secondary signals 224 in the first set of snapshots with a historical representation of the distributions over a longer period. In turn, sudden increases in divergence scores 228 may indicate the presence of potentially abusive requests 232 that cause distributions of secondary signals 224 within clusters 206 to deviate from historical patterns.

In one or more embodiments, divergence scores 228 measure differences in distributions 208 of secondary signals attributes 218 between the corresponding pairs of clusters 206. For example, each divergence score includes a Kullback-Leibler (KL) divergence that measures the divergence between distributions 208 of secondary signals attributes 218 in a corresponding pair of clusters 206. A KL divergence of 0 indicates that two distributions 208 are equal. As the distribution of secondary signals 218 in one cluster diverges from the distribution of secondary signals 218 in another cluster, the KL divergence between the distributions increases.

Because divergence scores 228 reflect deviations in secondary signals 218 grouped under similar primary signals 216 over time, analysis apparatus 202 is able to use divergence scores 228 to detect abusive requests 232 generated by bots and/or other automated techniques that utilize certain patterns of values of primary signals 216 and/or secondary signals 218. In particular, abusive requests 232 generated by automated techniques typically include values of primary signals 216 and/or secondary signals 218 that conform to certain patterns. Since these automated techniques do not have access to distributions 208 of primary signals 216 or secondary signals 218 in legitimate requests to the online system, the automated techniques are unable to generate abusive requests 232 that emulate these distributions 208. As a result, analysis apparatus 202 is able to detect automated attacks that alter distributions 208 of primary signals 216 and/or secondary signals 218 in the requests as an increase in one or more divergence scores 228 between distributions 208 of the requests over selected (e.g., consecutive or non-consecutive) time periods.

In one or more embodiments, analysis apparatus 202 detects abusive requests 232 by applying one or more thresholds to divergence scores 228. The thresholds include, but are not limited to, a numeric threshold (e.g., a maximum KL divergence between two distributions 208 of secondary signals 218 for a given primary signal signature) and/or a quantile threshold (e.g., a percentile in a distribution of KL divergences calculated from snapshots 210 of historical requests received over a number of hours, days, or weeks). The thresholds are optionally updated based on trends and/or patterns in distributions 208 and/or divergence scores 228 over time. For example, the threshold for a divergence score between snapshots 210 with the same primary signal signature from different time periods 226 may initially be set to a default value. After snapshots 210 with the same primary signal signatures 222 have been created over a certain number of time periods 226 (e.g., a number of days, weeks, months, etc.), distributions 208 and/or divergence scores 228 related to the snapshots are analyzed to detect seasonal patterns and/or changes in distributions 208 of secondary signals 218 within the snapshots. The threshold for divergence scores 228 calculated from subsequent snapshots 210 with the same primary signal signature may then be adjusted to reflect these patterns and/or changes (e.g., by increasing the threshold over a period that typically sees a change in the distribution of secondary signals 218 for requests grouped under the primary signal signature and decreasing the threshold over another period that typically does not experience a change in distribution of secondary signals 218 for requests grouped under the primary signal signature).

The thresholds also, or instead, include a threshold for a sum of two or more divergence scores 228 from multiple pairs of snapshots 210 with the same primary signal signature that span multiple time periods 226. For example, the thresholds include a threshold representing a maximum sum of two KL divergences calculated from pairs of snapshots 210 that span three time periods 226. This threshold can be used to detect more gradual changes to distributions 208 over longer time intervals.

When a given divergence score or series of divergence scores 228 does not meet a threshold (e.g., if the divergence score(s) exceed a corresponding threshold), analysis apparatus 202 determines that requests in snapshots 210 used to produce the divergence score(s) contain abusive requests 232 and identifies secondary signal values that are indicative of abusive requests 232. For example, analysis apparatus 202 uses snapshots 210 to identify one or more values of secondary signals 218 that contribute to an increase in the divergence score between two distributions 208 with the same primary signal signatures 222 (e.g., changes in proportions of secondary signal values that cause one distribution to diverge from another).

Analysis apparatus 202 then generates one or more secondary signal signatures 236 from the identified values of secondary signals 218 that contribute to increased divergence scores 228 and/or deviations in the corresponding distributions 208. For example, analysis apparatus 202 generates a secondary signal signature that includes a regular expression and/or another string-based pattern that can be matched to the identified secondary signal value(s).

Analysis apparatus 202 also includes functionality to detect additional abusive requests 234 using distribution scores 230 that are calculated from individual snapshots 210 of clusters 206 of requests. In one or more embodiments, each distribution score represents an anomalousness of a distribution of secondary signals 218 within a snapshot representing a cluster of requests by primary signals 216. The distribution score increases when the distribution deviates from a long-tailed distribution of attributes that is characteristic of legitimate (i.e., non-abusive) requests.

For example, each distribution score may be calculated using the following formula:

$$DSS = -\sum_{i=1}^{n} \left( \frac{P_A(x_i)}{\log_2 P_A(x_i)} \right)$$

In the above formula, "DSS" represents the distribution score, i is the index of each secondary signal value, n is the number of secondary signals calculated for the distribution, $x_i$ is the number of requests for secondary signal i, $P_A(x_i)$ is the adjusted probability of $x_i$.

Continuing with the above example, different equations are used to compute $P_A(x_i)$ based on comparisons of count ratios in the distribution. These count ratios are calculated by ordering values of the secondary signal by counts (or proportions) in the distribution and dividing the count of a given value in the ordering by the count of an adjacent (e.g., the next most frequent) value in the ordering. The count ratios are then compared to two thresholds, one representing a maximum "normal" (i.e., non-abusive) count ratio for a long-tailed distribution and another representing a minimum "normal" count ratio for a long-tailed distribution.

If a distribution contains count ratios that do not violate either of the thresholds, the adjusted probability is calculated using the following formula:

$$P_A(x_i) = \frac{x_i}{\sum_{j=1}^{n} x_j}$$

In other words, the adjusted probability of a given secondary signal value in a distribution with non-abusive count ratios is simply the probability of the secondary signal value, which is the count of the secondary signal value divided by the total number of requests across all secondary signal values in the distribution (e.g., the total number of requests in a given cluster).

Conversely, if a distribution contains one or more count ratios that violate a threshold, the adjusted probability is calculated using the following formula:

$$P_A(x_i) = \frac{x_i}{x_1 + \sum_{j=k}^{n} x_j}$$

In this instance, the adjusted probability of a given secondary signal value is calculated by dividing the count of the secondary signal value by a sum of the count of the most frequently occurring secondary signal value and counts of additional secondary signal values with normal count ratios, which are indexed from k to n. Thus, the distribution score increases when counts ratios in the distribution violate one or both thresholds. Calculation of distribution scores from distributions of attributes in requests is described in a co-pending non-provisional application entitled "Signal Distribution Score for Bot Detection," having Ser. No. 16/204,253 and filing date 29 Nov. 2018, which is incorporated herein by reference.

As with divergence scores 228, analysis apparatus 202 applies one or more thresholds to distribution scores 230 to identify abusive requests 234 in the corresponding distributions 208, clusters 206, and/or snapshots 210. Analysis apparatus 202 also generates one or more secondary signal signatures 238 from values of secondary signals 218 that contribute to abnormal distributions 208 and/or increased distribution scores 230 in the corresponding snapshots 210. For example, analysis apparatus 202 compares distribution scores 230 to a numeric, quantile, and/or another type of threshold. When a distribution score exceeds the threshold, analysis apparatus 202 identifies one or more values of secondary signals 218 that cause the distribution of secondary signals 218 in a corresponding snapshot to deviate from ratios of proportions of secondary signal values that are found in a long-tailed distribution. Analysis apparatus 202 then generates a secondary signal signature that includes a regular expression and/or another string-based pattern that matches the identified secondary signal value(s).

In some embodiments, analysis apparatus 202 reduces overhead, latency, and/or errors associated with monitoring or analyzing requests received by the online system by omitting the generation of distributions 208, snapshots 210, divergence scores 228, and/or distribution scores 230 for certain clusters 206 that match one or more filters 242. For example, filters 242 include a minimum or maximum cluster size, so that clusters 206 with numbers of requests that fall below the minimum or exceed the maximum are excluded from further analysis related to detecting abusive requests 232-234. In another example, filters 242 include a whitelist of values of primary signals 216 and/or secondary signals 218. When a request or set of requests includes primary and/or secondary signal values that match an entry in the whitelist, analysis apparatus 202 excludes the request(s) from clusters 206, distributions 208, snapshots 210, divergence scores 228, and/or distribution scores 230. As a result, abusive requests 232-234 may be detected from clusters 206 and/or distributions 208 of non-whitelisted primary and secondary signal values.

After abusive requests 232-234 are identified based on divergence scores 228 and/or distribution scores 230, analysis apparatus 202 provides primary signal signatures 222 and secondary signal signatures 236-238 of abusive requests 232-234 to management apparatus 204. Management apparatus 204 updates a signature list 220 with the provided primary signal signatures 222 and secondary signal signatures 236-238 and matches additional incoming requests to the online system to entries in signature list 220. When a request includes primary and/or secondary signal values that match an entry in signature list 220, management apparatus 204 performs one or more actions 120 for managing or mitigating a potential attack associated with the request.

For example, each entry in signature list 220 includes a first regular expression representing a primary signal signature and a second regular expression representing a secondary signal signature. As requests are received by the online system, management apparatus 204 compares the primary and secondary signals of each request to regular expressions in entries of signature list 220. If a request includes primary and secondary signal values that match those of an entry in signature list 220, management apparatus 204 identifies the request as a potentially abusive request. Management apparatus 204 then handles the request by performing an action (e.g., actions 120) such as blocking the request, delaying the request, redirecting the request (e.g., to a different resource than the one in the request), presenting a challenge (e.g., captcha challenge, two-factor authentication challenge, etc.), and/or generating an alert or notification of the potentially abusive request to an incident response team.

Management apparatus 204 additionally monitors outcomes associated with actions 120. For example, management apparatus 204 tracks the rates at which each type of challenge is shown, submitted, or solved for a given combination of primary and secondary signal values in signature list 220. In another example, management apparatus 204 monitors, for a given combination of primary and secondary signal values in signature list 220, the rate at which malicious activity is carried out or reported. Management apparatus 204 updates data repository 134 and/or another data store with the outcomes, and analysis apparatus 202 uses the outcomes to update thresholds associated with divergence scores 228 and distribution scores 230, a whitelist of primary and/or secondary signal values, and/or other parameters that affect the detection of abusive requests 232-234.

Management apparatus 204 also, or instead, adjusts actions 120 to reflect the outcomes. For example, management apparatus 204 uses the outcomes to identify a first combination of primary and secondary signal values in requests that lead to a high rate of malicious activity (e.g., greater than 80%). Management apparatus 204 then blocks subsequent requests that contain the same primary and secondary signal values. On the other hand, management apparatus 204 determines that requests with a second combination of primary and secondary signal values result in a mix of malicious and non-malicious activity (e.g., less than 50% malicious activity). In turn, management apparatus 204 performs less severe actions 120 in response to subsequent requests with that include the second combination of primary and secondary signal values, such as generating alerts of the requests, requiring human review of the requests, redirecting the requests, and/or presenting challenges in response to the requests.

Those skilled in the art will appreciate that the system of FIG. 2 may be implemented in a variety of ways. First, analysis apparatus 202, management apparatus 204, and/or data repository 134 may be provided by a single physical machine, multiple computer systems, one or more virtual machines, a grid, one or more databases, one or more filesystems, and/or a cloud computing system. Analysis apparatus 202 and management apparatus 204 may additionally be implemented together and/or separately by one or more hardware and/or software components and/or layers.

Second, analysis apparatus 202 and management apparatus 204 may be implemented and/or deployed in various parts of network infrastructure in the online system. For example, analysis apparatus 202 may be deployed in data centers, collocation centers, cloud computing systems, clusters, content delivery networks, and/or other collections of network-enabled devices or computer systems that contain services and/or service endpoints in the online system. As a result, analysis apparatus 202 is able to monitor and handle traffic to the online system from various locations (e.g., Internet Protocol (IP) addresses, subnets, regions, etc.). In turn, management apparatus 204 may be deployed in points of presence (PoPs) for the online system to block, redirect, or take other actions 120 on abusive requests before the requests reach the services and/or service endpoints.

Third, different techniques may be used to generate clusters 206, divergence scores 228, distribution scores 230, primary signal attribute signatures 222, secondary signal attribute signatures 236-238, and/or other data that is used to detect and handle abusive requests. For example, clusters 206 may be produced using hierarchical clustering, centroid-based clustering, distribution-based clustering, density-based clustering, grid-based clustering, and/or other types of clustering techniques. In another example, clusters 206 and distributions 208 may be produced from different types or combinations of primary signals 216 and secondary signals 218. In a third example, analysis apparatus 202 may generate multiple sets of clusters 206, distributions 208, and snapshots 210 from multiple combinations of primary signals 216 and secondary signals 218. Analysis apparatus 202 may then calculate divergence scores 228 and distribution scores 230 from snapshots 210 of each set of clusters 206 to detect abusive requests 232-234 that contain complex patterns of attribute values. In a fourth example, divergence scores 228 may be calculated using Jensen-Shannon divergences, Wasserstein distances, and/or other measures of distance between distributions 208.

Figure 3A:
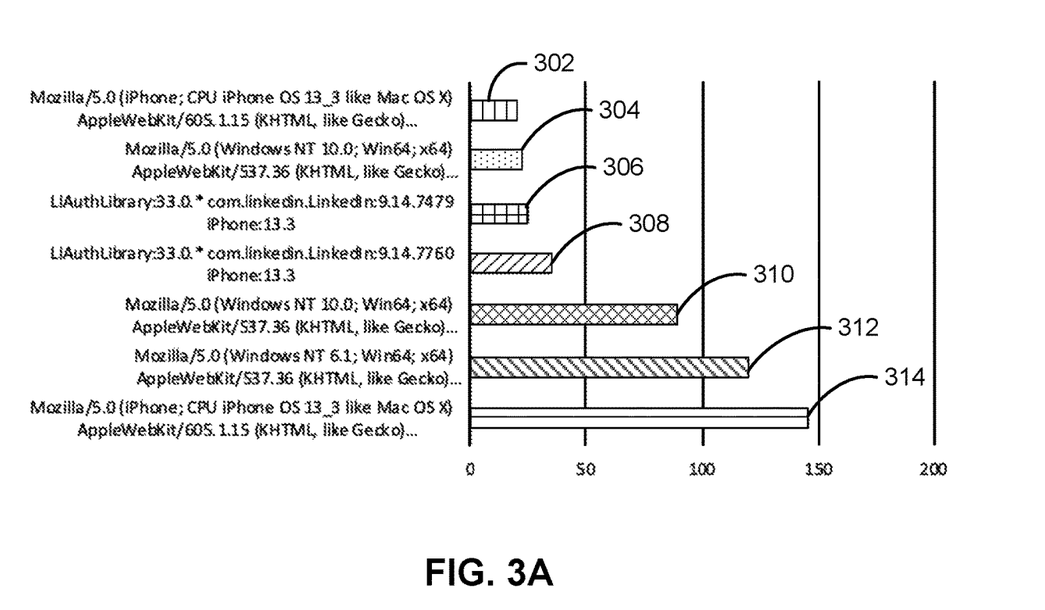
FIG. 3A shows an example distribution of attribute values in a set of requests in accordance with the disclosed embodiments.

FIG. 3A shows an example distribution of attribute values in a set of requests in accordance with the disclosed embodiments. In particular, FIG. 3A shows a chart of a distribution of secondary signal values (User-Agent strings) of a first cluster of requests, after the first cluster is generated based on distances between values of one or more primary signals (e.g., Referer fields).

As shown in FIG. 3A, the chart includes a number of bars 302-314 representing counts of User-Agent strings in the cluster. Bars 302-314 indicate that the User-Agent strings adhere to a long-tailed distribution, which is typical in non-abusive requests.

As mentioned above, the distribution may be stored in a snapshot (e.g., snapshots 210) of the clustered requests for comparison with a subsequent distribution of requests that are clustered by the same primary signal value(s). For example, the snapshot may include a signature representing the primary signal value(s), followed by a list of mappings between User-Agent strings (or hashes of the User-Agent strings) in the requests and counts of the User-Agent strings in the requests. The snapshot may additionally include a total number of requests in the cluster, which allows proportions of the User-Agent strings in the cluster to be calculated (e.g., by dividing the count of each User-Agent string by the total number of requests in the cluster).

Figure 3B:
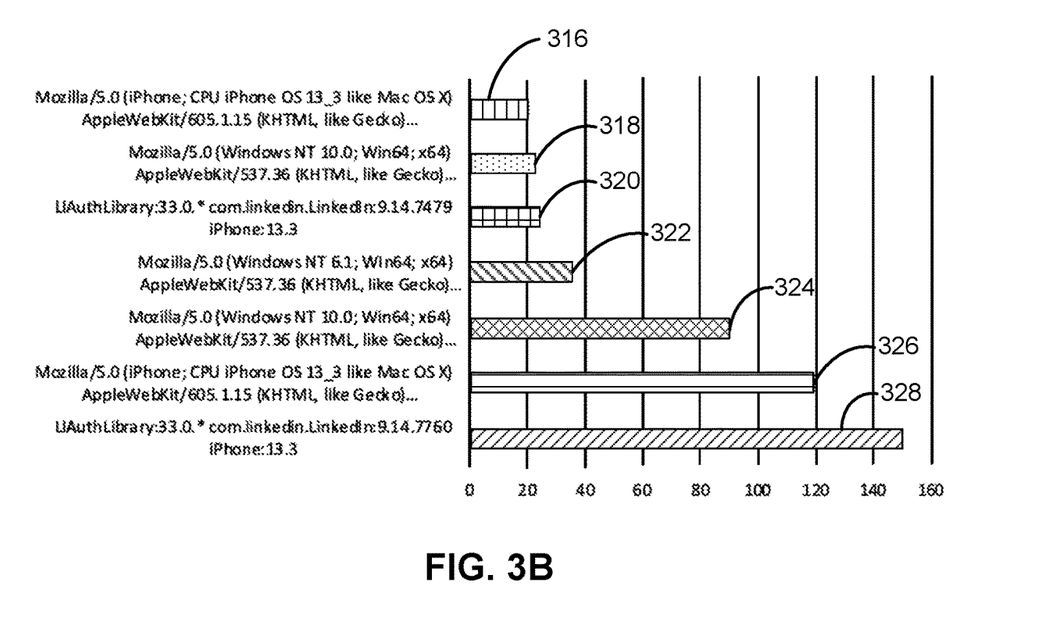
FIG. 3B shows an example distribution of attribute values in a set of requests in accordance with the disclosed embodiments.

FIG. 3B shows an example distribution of attribute values in a set of requests in accordance with the disclosed embodiments. More specifically, FIG. 3B shows a chart of a distribution of secondary signal values (i.e., User-Agent strings) in a second cluster of requests. The second cluster includes requests received in a subsequent time period after the time period spanned by requests in the first cluster. The second cluster additionally includes primary signal values that can be matched to the signature of the primary signal values in the first cluster.

Like the chart of FIG. 3A, the chart of FIG. 3B includes a number of bars 316-328 that represent counts of User-Agent strings in the cluster. As shown in FIG. 3B, bars 316-328 include the same User-Agent values as bars 302-314 in the chart of FIG. 3A. Bars 316-328 also follow a long-tailed distribution that is typical of non-abusive requests. As a result, a distribution score (e.g., distribution scores 230) that is calculated from the distribution of FIG. 3B may be unable to reveal the presence of potentially abusive requests in the second cluster.

However, bars 316-328 indicate a significant change in the counts and/or proportions of some User-Agent strings between the first and second clusters. In particular, bars 308 and 328 show a sharp increase in the count and proportion of requests with the User-Agent string of "LIAuthLibrary: 33.0*com.linkedin.Linkedin:9.14.7760 iPhone:13.3" from the first cluster to the second cluster. This increase can be detected by calculating a divergence score (e.g., divergence scores 228 of FIG. 2) between both distributions and comparing the divergence score to a threshold. After the divergence score is determined to exceed the threshold, counts or proportions of User-Agent strings in the distributions are compared to determine that bar 328 contains the highest proportion of requests with a single User-Agent string in the second cluster, while bar 308 contains the fourth lowest proportion of requests with the same User-Agent string in the first cluster. As a result, signatures for the User-Agent string associated with bars 308 and 328 and Referer value(s) in requests from the first and second clusters are added to an entry in a signature list (e.g., signature list 220 of FIG. 2). The entry is then used to block or otherwise handle subsequent requests with Referer and User-Agent values that match the signatures, as discussed above.

Figure 4:
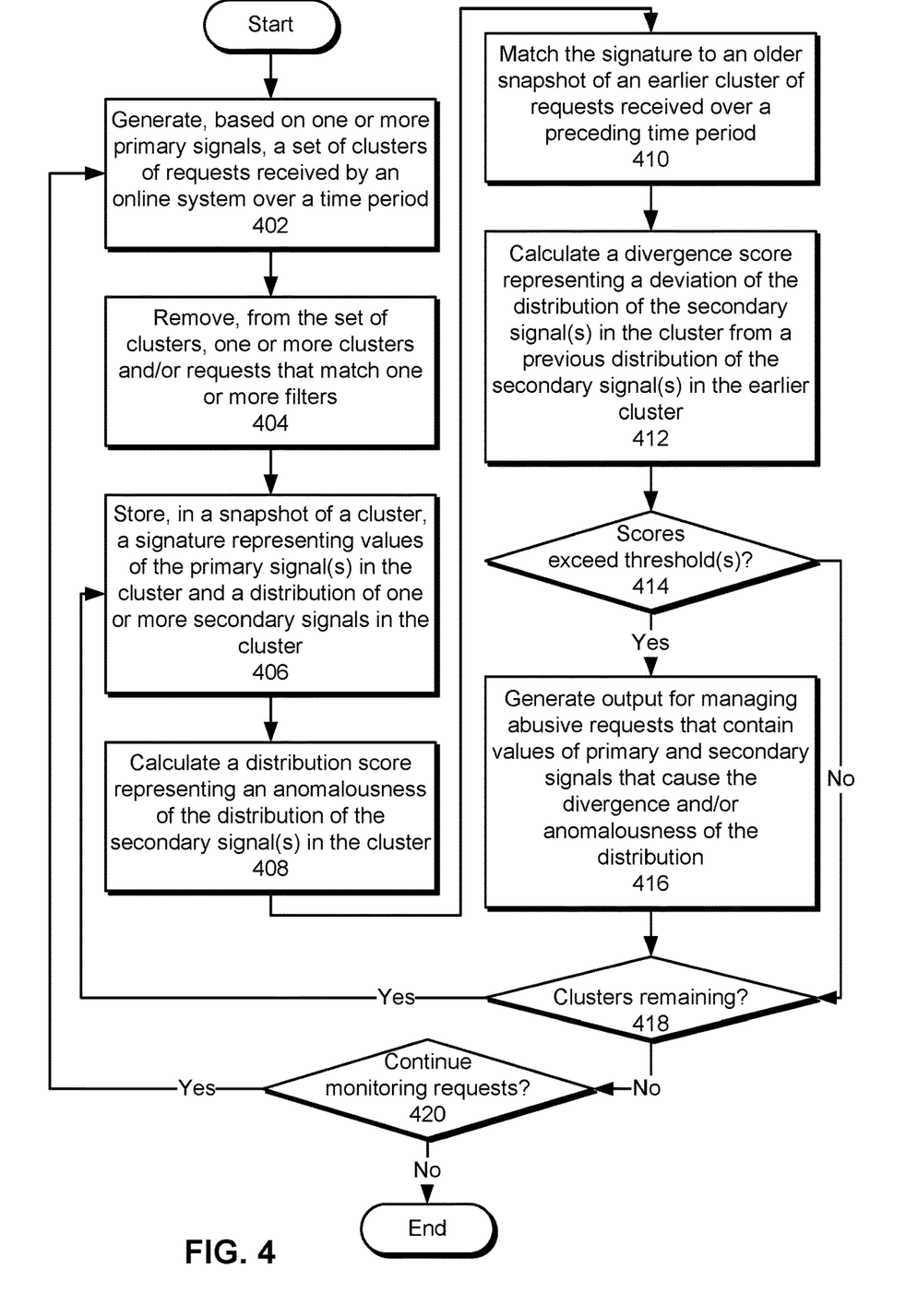
FIG. 4 shows a flowchart illustrating a process of detecting abusive requests in accordance with the disclosed embodiments.

FIG. 4 shows a flowchart illustrating a process of detecting abusive requests in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a set of clusters of requests received by an online system over a time period is generated based on one or more primary signals (operation 402) of the requests. For example, the clusters may be received over a time period that spans a number of minutes and/or hours. Primary signal(s) of the requests include, but are not limited to, User-Agent, Referer, Accept-Encoding, and/or other fields or sets of fields in HTTP headers of the requests. The clusters may be generated based on edit distances between strings in the primary signal(s) and/or Jaccard similarities between sets of tokens in the primary signal(s). The clusters may also, or instead, be generated to include requests that are mutually density-connected with respect to the primary signal(s) (e.g., using DBSCAN and/or another density-based clustering technique).

Next, one or more clusters and/or requests that match one or more filters are removed from the set of clusters (operation 404). For example, the filters include a minimum cluster size, maximum cluster size, and/or a whitelist of values of the primary signal(s) and/or one or more secondary signals. When a cluster does not meet the minimum or maximum cluster size, the cluster is omitted from the set of clusters. When one or more requests in a cluster match a set of primary signal and/or secondary signal values in the whitelist, the request(s) are omitted from the cluster. As a result, operation 404 may be used to omit clusters and/or requests that are not likely to contain detectable abusive requests from further processing.

Individual clusters in the set of clusters are then analyzed to detect potential abusive requests in the clusters. First, a signature representing values of the primary signal(s) in a cluster and a distribution of the secondary signal(s) in the cluster are stored in a snapshot of the cluster (operation 406). For example, the signature includes a regular expression that can be matched to any of the primary signal values of requests in the cluster, and the distribution includes mappings of representations (e.g., hashes, string values, etc.) of the secondary signal(s) to counts of the secondary signal(s) in the cluster and/or a total number of requests in the cluster. The signature and distribution are included in the snapshot, and the snapshot is stored or cached for subsequent retrieval and use.

Next, a distribution score representing an anomalousness of the distribution of the secondary signal(s) in the cluster is calculated (operation 408). For example, the distribution score characterizes the deviation of the distribution of the secondary signal(s) from a long-tailed distribution that is typically found in non-abusive traffic.

The signature is matched to an older snapshot of an earlier cluster of requests received over a preceding time period (operation 410). For example, the signature is used to perform a lookup of the older snapshot in a cache and/or data store. A divergence score representing a deviation of the distribution of the secondary signal(s) in the cluster from a previous distribution or an aggregation of a set of previous distributions of the secondary signal(s) in the earlier cluster is then calculated (operation 412). For example, the divergence score includes a KL divergence, JS divergence, and/or another measure of distance or divergence between distributions. If the signature cannot be matched to an older snapshot of requests received over a preceding time period (e.g., if an older snapshot with the same signature does not exist), operation 412 is omitted.

The distribution and divergence scores are then compared to one or more thresholds (operation 414), and additional processing related to the cluster is performed based on the comparison. If neither score exceeds one or more corresponding thresholds, the cluster is determined to lack abusive requests, and no further processing is required.

If the divergence score and/or distribution score violate one or more corresponding thresholds, output for managing abusive requests that contain values of the primary and secondary signals that cause the divergence and/or anomalousness of the distribution is generated (operation 416). For example, one or more secondary signal values that cause the distribution to diverge from the previous distribution and/or a long-tailed distribution are identified based on differences between proportions of the secondary signal value(s) in the distributions and/or ratios between counts of the secondary signal value(s) in the distributions. A signature that includes a string pattern (e.g., regular expression) representing the identified value(s) of the secondary signal(s) is generated, and an entry containing the signature of the identified secondary signal value(s) and the signature of the primary signal values from the snapshot of the cluster is added to a list of signatures of abusive requests. The list of signatures is then outputted to allow potentially abusive requests with the primary signal values in the cluster and the secondary signal value(s) that cause the distribution to deviate from the previous distribution and/or a long-tailed distribution to be identified and handled (e.g., blocked, delayed, rerouted, challenged, flagged, reported, etc.).

Operations 406-416 may be repeated for remaining clusters (operation 418) in the set of clusters. As a result, a snapshot of each cluster in the set of clusters is generated and stored (operation 406). A distribution score and/or divergence score are also calculated for the cluster (operations 408-412) and compared to thresholds to detect and manage abusive requests in the online system (operation 414-416).

Operations 402-418 may additionally be repeated while requests to the online system are monitored (operation 420). For example, a new set of clusters of requests is generated after a given time period over which the requests are received has lapsed (operation 402). The clusters are filtered (operation 404), and each cluster is analyzed to identify and manage potentially abusive requests with certain primary and/or secondary signal values (operations 406-418).

Figure 5:
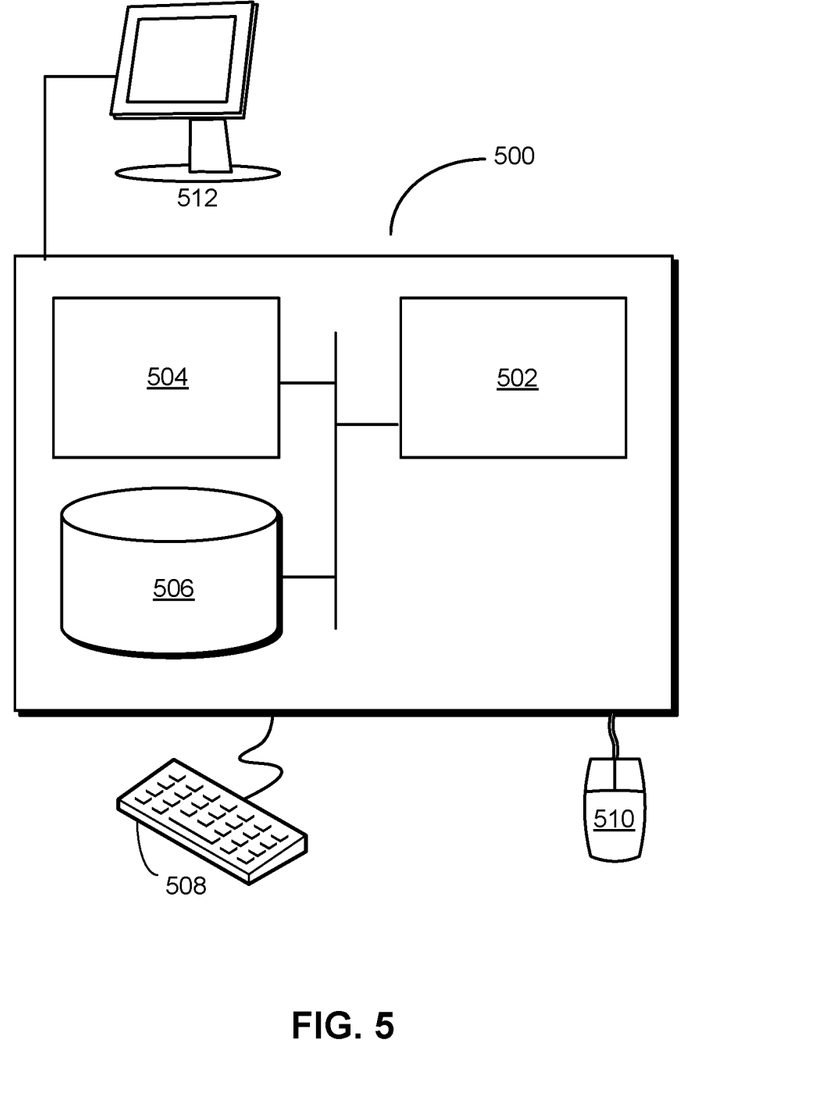
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 also includes input/output (I/O) devices such as a keyboard 508, a mouse 510, and a display 512.

Computer system 500 includes functionality to execute various components of the present embodiments. In particular, computer system 500 includes an operating system (not shown) that coordinates the use of hardware and software resources on computer system 500, as well as one or more applications that perform specialized tasks for the user. To perform tasks for the user, applications obtain the use of hardware resources on computer system 500 from the operating system, as well as interact with the user through a hardware and/or software framework provided by the operating system.

In one or more embodiments, computer system 500 provides a system for detecting abusive requests. The system includes an analysis apparatus and a management apparatus, one or more of which may alternatively be termed or implemented as a module, mechanism, or other type of system component. The analysis apparatus generates, based on one or more primary signals of requests received by an online system, a first set of clusters of the requests that span a first time period and a second set of clusters of the requests that span a second time period following the first time period. Next, the analysis apparatus stores, in a first snapshot of a first cluster in the first set of clusters, a first signature representing a first set of values of the primary signal(s) in the first cluster and a first distribution of one or more secondary signals in the first cluster. The analysis apparatus then matches, to the first signature, a second set of values of the primary signal(s) from a second cluster in the second set of clusters. The analysis apparatus also calculates a divergence score representing a deviation of a second distribution of the secondary signal(s) in the second cluster from the first distribution. When the divergence score does not meet a first threshold, the management apparatus generates output for managing abusive requests that contain the first set of values of the primary signal(s) and one or more values of the secondary signal(s) that cause the second distribution to deviate from the first distribution.

In addition, one or more components of computer system 500 may be remotely located and connected to the other components over a network. Portions of the present embodiments (e.g., analysis apparatus, management apparatus, data repository, online network, anti-abuse infrastructure, etc.) may also be located on different nodes of a distributed system that implements the embodiments. For example, the present embodiments may be implemented using a cloud computing system that detects and manages requests from a set of remote entities and/or to a remote online system.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   generating, based on one or more primary signals of network requests received by an online system, a first set of clusters of the network requests that span a first time period and a second set of clusters of the network requests that span a second time period following the first time period;
   storing, in a first snapshot of a first cluster in the first set of clusters:
      a first signature comprising a string-based representation of a first set of values of the one or more primary signals in the first cluster; and
      a first distribution of one or more secondary signals in the first cluster;
   matching, to the first signature, a second set of values of the one or more primary signals from a second cluster in the second set of clusters;
   calculating a divergence score representing a deviation of a second distribution of the one or more secondary signals in the second cluster from the first distribution; and
   when the divergence score does not meet a first threshold, generating output for identifying a first set of additional network requests that contain the first set of values of the one or more primary signals and one or more values of the one or more secondary signals in the second cluster.

2. The method of claim 1, further comprising:
   when a third cluster in the first set of clusters matches one or more filters, omitting generation of a second snapshot of the third cluster.

3. The method of claim 2, wherein the one or more filters comprise at least one of:
   a cluster size; and
   a whitelist of values of the one or more primary signals.

4. The method of claim 1, further comprising:
   generating a third set of clusters of the network requests that span a third time period;
   calculating, for a third cluster in the third set of clusters, a distribution score representing an anomalousness of a third distribution of the one or more secondary signals in the third cluster; and
   when the distribution score does not meet a second threshold, generating additional output for identifying a second set of additional network requests that contain one or more additional values of the one or more primary signals and the one or more secondary signals in the third cluster.

5. The method of claim 1, wherein generating the first and second sets of clusters comprises:
   generating the first and second sets of clusters based on edit distances between the one or more primary signals of the network requests.

6. The method of claim 1, wherein generating the first and second sets of clusters comprises:
   generating the first and second sets of clusters to include requests that are mutually density-connected with respect to the one or more primary signals.

7. The method of claim 1, wherein generating the first and second sets of clusters comprises:
   generating the first and second sets of clusters based on Jaccard similarities between sets of tokens in the one or more primary signals of the network requests.

8. The method of claim 1, wherein generating the output for identifying the first set of additional network requests comprises:
   generating a second signature comprising a string pattern representing the one or more values of the one or more secondary signals that cause the divergence of the second distribution from the first distribution;
   adding an entry comprising the first and second signatures to a list of signatures of abusive requests; and
   outputting the list of signatures for use in identifying and processing the first set of additional network requests with the first set of values of the one or more primary signals and the one or more values of the one or more secondary signals in the second cluster.

9. The method of claim 8, wherein generating the output for identifying the first set of additional network requests further comprises:
   identifying the one or more values of the one or more secondary signals that cause the divergence of the second distribution from the first distribution based on differences between proportions of the one or more values in the first and second distributions.

10. The method of claim 9, wherein processing the first set of additional network requests comprises at least one of:
    blocking a first request;
    generating an alert of a second request;
    delaying a third request;
    redirecting a fourth request; and
    presenting a challenge to a fifth request.

11. The method of claim 1, wherein:
    the first signature comprises a regular expression; and
    the first distribution comprises a total number of requests in the first cluster and mappings of representations of a second set of values of the one or more secondary signals to counts of the second set of values in the first cluster.

12. The method of claim 1, wherein the one or more primary signals and the one or more secondary signals comprise at least one of:
    a User-Agent string;
    a Referer;
    an Accept-Encoding field;
    a Cookie; and
    a set of header fields.

13. A system, comprising:
    an analysis apparatus configured to:
       generate, based on one or more primary signals of network requests received by an online system, a first set of clusters of the network requests that span a first time period and a second set of clusters of the network requests that span a second time period following the first time period;
       store, in a first snapshot of a first cluster in the first set of clusters:
          a first signature comprising a string-based representation of a first set of values of the one or more primary signals in the first cluster; and a first distribution of one or more secondary signals in the first cluster;

match, to the first signature, a second set of values of the one or more primary signals from a second cluster in the second set of clusters;

calculate a divergence score representing a deviation of a second distribution of the one or more secondary signals in the second cluster from the first distribution; and a management apparatus configured to:
when the divergence score does not meet a first threshold, generate output for identifying a first set of additional network requests that contain the first set of values of the one or more primary signals and one or more values of the one or more secondary signals in the second cluster.

14. The system of claim 13, wherein the analysis apparatus is further configured to:
generate a third set of clusters of the network requests that span a third time period;
calculate, for a third cluster in the third set of clusters, a distribution score representing an anomalousness of a third distribution of the one or more secondary signals in the third cluster; and
when the distribution score does not meet a second threshold, generate additional output identifying a second set of additional network requests that contain one or more additional values of the one or more primary signals and the one or more secondary signals in the third cluster.

15. The system of claim 13, wherein generating the first and second sets of clusters comprises at least one of:
generating the first and second sets of clusters based on edit distances between the one or more primary signals of the network requests;
generating the first and second sets of clusters to include requests that are mutually density-connected with respect to the one or more primary signals; and
generating the first and second sets of clusters based on Jaccard similarities between sets of tokens in the one or more primary signals of the network requests.

16. The system of claim 13, wherein generating the output for managing the abusive requests comprises:
identifying the one or more values of the one or more secondary signals that cause the divergence of the second distribution from the first distribution based on differences between proportions of the one or more values in the first and second distributions;
generating a second signature comprising a string pattern representing the one or more values of the one or more secondary signals;
adding an entry comprising the first and second signatures to a list of signatures of abusive requests; and outputting the list of signatures for use in identifying and processing the first set of additional network requests with the first set of values of the one or more primary signals and the one or more values of the one or more secondary signals.

17. The system of claim 16, wherein processing the abusive requests comprises at least one of:
blocking a first request;
generating an alert of a second request;
delaying a third request;
redirecting a fourth request; and
presenting a challenge to a fifth request.

18. The system of claim 13, wherein:
the first signature comprises a regular expression; and
the first distribution comprises mappings of representations of a second set of values of the one or more secondary signals to counts of the second set of values in the first cluster.

19. The system of claim 13, wherein the one or more primary signals and the one or more secondary signals comprise at least one of:
a User-Agent string;
a referer;
an Accept-Encoding field; and
a set of header fields.

20. A system, comprising:
means for generating, based on one or more primary signals of network requests received by an online system, a first set of clusters of the network requests that span a first time period and a second set of clusters of the network requests that span a second time period following the first time period;
means for storing, in a first snapshot of a first cluster in the first set of clusters:
a first signature comprising a string-based representation of a first set of values of the one or more primary signals in the first cluster; and
a first distribution of one or more secondary signals in the first cluster;
means for matching, to the first signature, a second set of values of the one or more primary signals from a second cluster in the second set of clusters;
means for calculating a divergence score representing a deviation of a second distribution of the one or more secondary signals in the second cluster from the first distribution; and
a management apparatus configured to:
when the divergence score does not meet a first threshold, generate output for identifying a first set of additional network requests that contain the first set of values of the one or more primary signals and one or more values of the one or more secondary signals in the second cluster.

\* \* \* \* \*